Aug. 4, 1964

H. GASSNER ETAL 3,142,953

DRIVE SYSTEM FOR FALSE TWISTERS

Filed May 16, 1962

Inventors
Hans Gessner
Otto Lang
By Stevens Davis Miller & Mosher
Attorneys

United States Patent Office 3,142,953
Patented Aug. 4, 1964

3,142,953
DRIVE SYSTEM FOR FALSE TWISTERS
Hans Gassner, Schweinfurt, and Otto Lang, Hammelburg, Germany, assignors to Kugelfischer Georg Schafer & Co., Schweinfurt, Germany
Filed May 16, 1962, Ser. No. 207,834
Claims priority, application Germany May 17, 1961
3 Claims. (Cl. 57—77.45)

It has been known that the high-twist crimping method using false twisting spindles, also termed rotating tubes, which are carried in antifriction bearings cannot be applied beyond a maximum rotary speed of 100,000 revolutions per minute. For the purpose of permitting the use of rotary speeds exceeding the said limit and thus increasing the production rate accordingly, there has been proposed a drive system for false twisters of the type named and intended for the continuous crimping of synthetic threads, in which the said rotating tube is constituted by an armature body of rotationally symmetrical shape which is provided with peripherally extending collars, the said armature body being disposed in a magnetic field and being adapted to be driven at a high rate of speed by a driving disc which is carried in bearings of conventional design. However, neither the arrangement just described nor another also known proposal according to which a small tube having no peripheral collars is arranged between two driving discs have proved capable of affording the kind of improvement which has long been desired in the field of modern crimped yarn production.

According to the present invention, a significant increase in the number of revolutions of the rotary tube up to 500,000 revolutions per minute can, as has been shown by extensive test runs, be provided in a drive system for false twisters used in the continuous crimping of synthetic threads by providing a rotary tube in the form of an armature body of rotationally symmetrical shape, the armature body being adapted to be rotationally driven in a magnetic field between driving discs, and the armature body having two peripheral collars adjacent to the drive discs; according to the invention, this effect is secured by providing the said armature body with collars having tapered end faces and projecting outwardly to such an extent that they co-operate with pole piece supporting members having a smaller radius of curvature in such a manner as to effect a concentration of the magnetic flux at the edges of the supporting members.

According to a specific feature of the invention, the magnetic flux penetrates the armature body in axial direction. Thus, the magnetic flux acts in the same direction as the pull exerted by the synthetic thread to be crimped. According to another feature of the invention, the free end member of the permanent magnet co-operating magnetically with the said collars may be bifurcated. In this manner, the magnetic flux is concentrated towards the collars of the armature body.

According to still another feature of the invention, the receiving edges of the pole pieces may be disposed within that angular range which is delimited by radii which are perpendicular to the common tangents of the armature cross section and one driving disc each, the result of such an arrangement being that the armature body is attracted into the magnetic field by particularly strong forces tending to improve the frictional contact between the armature body and the drive discs. According to the invention, the faces of the drive discs should always remain in the same plane. Thus, only a slight skewing action is exerted on the armature body in an axial direction, and the armature body is preventing from moving in an axial direction.

According to a further feature of the invention, there is provided so small a clearance between the base of each collar and the respective adjacent drive disc that the collar, even if it should perform the largest possible axial motion together with the armature body, will remain in the region where it is subject to the magnetic retracting force which tends to pull the armature body back into its operating position; thus, the armature body can move only slightly from its operating position and is, therefore, prevented from escaping from the zone in which the magnetic field is effective to retain the armature body.

According to another feature of the invention, the pair of drive discs is preferably formed as a one-piece spool member made of a plastic material. This makes it possible to manufacture the drive discs by simple mass-production methods and further ensures smooth rotation in view of the fact that out-of-balance forces are negligible.

Other objects and features of the invention will become apparent as the description proceeds, especially when taken in conjunction with the accompanying drawings, illustrating a preferred embodiment of the invention, wherein.

Figure 1:
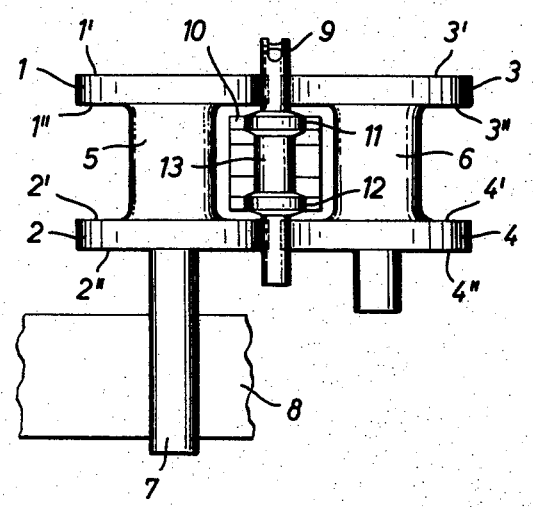
FIG. 1 is a plan view of a drive system according to the invention.

As will be seen in FIG. 1, the spools 5 and 6 which are made of plastic material and each carry a pair of disc portions 1, 2 and 3, 4, respectively, are supported in a conventional manner and are carried by a tilting device (not shown) in such a manner that the extended axle 7 of the twin discs 1, 2 functions as a whorl and can be driven by a tangentially disposed belt. The twin discs 3, 4 operates as an idler. The twin discs 3, 4 are spaced apart from the twin discs 1, 2 driven by belt 8 in such a manner that the two pairs of discs 1, 2 and 3, 4 form the most favorable embracing angle (see also FIG. 2 to be discussed later on) enclosing the rotary tube 9 of small diameter which is held in position by a permanent magnet 10.

The rotary tube 9 constituting the armature body of magnet 10 is provided with a pair of collars 11 and 12 serving as opposite poles for the permanent magnet 10. The collars are disposed at a small distance from the discs 1, 3 and 2, 4, respectively and are separated by an elongated central portion 13 of the armature body. This ensures that the rotary tube is prevented from tilting during its operation at an extremely high rotary speed. The great stability afforded in this manner for the rotary tube is of particular advantage in that it permits the rotary tube to be held in position by small magnetic forces. This, in turn, results in the fact that the eddy-current braking action exerted on the rotary tube in the magnetic field is almost negligible and that only a slight amount of heating results.

The collars 11 and 12 of the rotary tube project for a considerable distance in a radial direction and are provided with tapered end faces 14 and 15 facing the free ends of the tube, and with similarly formed inner end faces 16 and 17 facing the central portion 13 of the tube. Should the end faces 14 and 15 come into contact with the edges of the discs 1, 3 and 2, 4, respectively, whose end faces 1', 3' and 1", 3" and 2', 4' and 2", 4" respectively lie in common planes, they will contact the discs along circular lines and will thus prevent the operation of the system from being disturbed. The alignment between the disc faces 1', 3' and 2', 4' has the effect that only a slight skewing action is exerted on the armature body 9 in an axial direction, the result being that the armature body will not be displaced axially.

Figure 2:
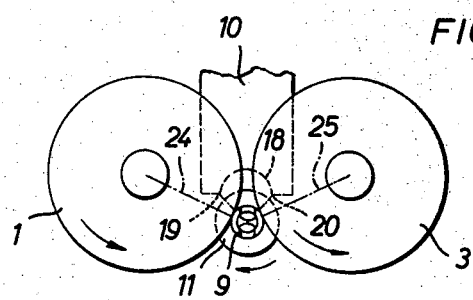
FIGS. 2 and 3 show further details of the arrangement of FIG. 1.
Figure 3:
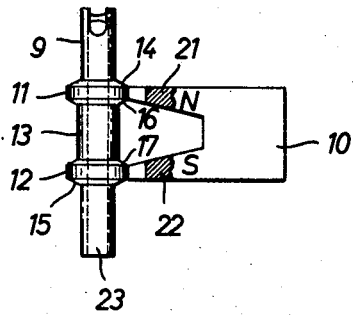

As will be seen in FIG. 2, the collars, such as collar 11, co-operate with pole piece supports, such as support 18, having a radius of curvature smaller than that of the largest cross section of collar 11, in such a manner that the magnetic flux is concentrated at the edges 19 and 20 of the pole piece supports. This concentration of the magnetic flux virtually draws the rotary tube into the space defined by the discs 1, 3 and 2, 4. The magnetic flux extends from the permanent magnet 10, i.e. from the vertically superimposed prongs of the bifurcated magnet (21, 22) through the collars 11, 12 of the rotary tube, in an axial direction of the tube through the central portion 13 of the latter, so that in this portion the direction of the flux is the same as the direction of motion of the thread to be crimped, the thread passing the bore 23 of the rotary tube and being subject to tension.

The fact mentioned earlier that the collars 11, 12 are closely adjacent to the discs 1, 3 and 2, 4, respectively, ensures that there is but an extremely small clearance between the base of each collar and the adjacent disc. Thus, even in cases in which the armature body is deflected axially to the greatest possible extent, the respective collar 11 or 12 will remain in the zone of action of the retracting force exerted by the magnetic field extending from the pole pieces 21 and 22 so as to be constantly pulled into its normal operating position. Thus also this feature contributes to the elimination of trouble such as might otherwise be caused by the collars escaping from the zone in which the magnetic field is sufficiently effective.

The supporting edges 19 and 20 lie within that angle whose limbs 24 and 25 are constituted by radii which are normal to the common tangents to the cross section of the armature body and the associated drive discs, e.g. 1 and 3 (see FIG. 2). The frictional contact between the armature body and the drive discs 1, 3 and 2, 4 is thus ensured in a particularly reliable manner, since the stability of the arrangement is ensured.

What is claimed is:

1. A high speed rotary drive for false twisting spindles, comprising laterally spaced pairs of coaxial discs, each of the pairs coplanarly arranged, a rotary twisting tube received between the pairs of discs, and magnetic means attracting the tube against the peripheries of the discs, the tube provided with two axially spaced collars having outwardly tapering cross-section, each collar being adjacent to an associated pole piece of the magnetic means, each of the pole pieces having an inwardly curved recess of substantially smaller radius than that of the adjacent collar, the recess forming two edges within the pole pieces which edges subtend at the axis of the tube an angle which lies inside the angle included between the radii from the axis of the tube to the axes of rotation of the discs, and the recess being located opposite the collars so that a concentration of the magnetic flux between the collar and the edges of the recess of the pole piece is achieved.

2. The device of claim 1, wherein the magnetic means comprise a magnet of horse-shoe shape, with one pole piece associated with one of the collars and the other pole piece associated with the other collar.

3. The device of claim 1, wherein each coaxial pair of discs is formed as a one-piece spool made of synthetic resin material.

References Cited in the file of this patent

UNITED STATES PATENTS

| | | |
|---|---|---|
| 687,428 | Heinze | Nov. 26, 1901 |
| 2,951,387 | Cox | Sept. 6, 1960 |
| 3,059,408 | Hippe et al. | Oct. 23, 1962 |

FOREIGN PATENTS

| | | |
|---|---|---|
| 1,249,599 | France | Nov. 21, 1960 |
| 848,971 | Great Britain | Sept. 21, 1960 |
| 862,319 | Great Britain | Mar. 8, 1961 |